(12) United States Patent
Lee et al.

(10) Patent No.: US 7,990,504 B2
(45) Date of Patent: Aug. 2, 2011

(54) LIQUID CRYSTAL DISPLAY AND DRIVING METHOD THEREOF

(75) Inventors: Jun-Woo Lee, Anyang-si (KR);
Hee-Seop Kim, Hwaseong-si (KR);
Mee-Hye Jung, Suwon-si (KR);
Seung-Hoon Lee, Yongin-si (KR);
Jiangang Lu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 12/061,193

(22) Filed: Apr. 2, 2008

(65) Prior Publication Data
US 2009/0040412 A1 Feb. 12, 2009

(30) Foreign Application Priority Data
Aug. 7, 2007 (KR) .................. 10-2007-0078924

(51) Int. Cl.
*G02F 1/1343* (2006.01)

(52) U.S. Cl. ............ 349/141; 349/38; 349/39; 349/142; 349/144

(58) Field of Classification Search .................. None
See application file for complete search history.

(56) References Cited

U.S. PATENT DOCUMENTS 7,301,595 B2 * 11/2007 Koma .................. 349/130
2006/0192739 A1 * 8/2006 Shin et al. .................. 345/90

* cited by examiner

*Primary Examiner* — Hemang Sanghavi
(74) *Attorney, Agent, or Firm* — H.C. Park & Associates, PLC

(57) ABSTRACT

A liquid crystal display includes first and second thin film transistors, a pixel electrode including a first cutout and an inclination direction determining member and connected to the first thin film transistor, a direction controlling electrode connected to the second thin film transistor, a first storage electrode overlapping with the pixel electrode and the direction controlling electrode and applied with a first storage electrode signal having a first voltage, and second storage electrode overlapping with the direction controlling electrode to receive a second storage electrode signal having a second voltage that periodically changes.

20 Claims, 9 Drawing Sheets

US 7,990,504 B2

LIQUID CRYSTAL DISPLAY AND DRIVING METHOD THEREOF

CROSS-REFERENCE TO RELATED APPLICATION

This application claims priority from and the benefit of Korean Patent Application No. 10-2007-0078924, filed on Aug. 7, 2007, which is hereby incorporated by reference for all purposes as if fully set forth herein.

BACKGROUND OF THE INVENTION

1. Field of the Invention

The present invention relates to a liquid crystal display (LCD) and a method for driving the LCD. More specifically, the present invention relates to a vertical alignment (VA) mode LCD that may obtain a wide viewing angle without the formation of a cutout or a protrusion in the common electrode.

2. Discussion of the Background

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

Among LCDs, a vertical alignment (VA) mode LCD, which aligns LC molecules such that the long axes of the LC molecules are perpendicular to the panels in the absence of an electric field, is spotlighted because of its high contrast ratio and wide reference viewing angle. A wide reference viewing angle is defined as a viewing angle that makes the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed in several directions using the cutouts and the protrusions such that the reference viewing angle is widened.

However, in order to form the cutouts in the pixel electrode and the common electrode, an additional mask to pattern the common electrode is needed, and an overcoat to prevent the pigments of the color filter from contaminating the liquid crystal layer through the cutout of the common electrode should be included on the color filter. Furthermore, in order to form the protrusions, an additional process is needed or the existent process should be changed, and thus the manufacturing method of the liquid crystal display becomes complicated. In addition, the LC molecules disposed close to the protrusions or the cutouts are controlled in a VA mode LCD, but because the influence of the protrusions or the cutouts is weaker on the LC molecules disposed away from the protrusions or the cutouts, the response speed of the display device may decrease.

SUMMARY OF THE INVENTION

The present invention provides a VA mode LCD that may obtain a wide viewing angle without formation of a cutout or a protrusion in the common electrode.

Additional features of the invention will be set forth in the description which follows, and in part will be apparent from the description, or may be learned by practice of the invention.

The present invention discloses an LCD including first and second thin film transistors, a pixel electrode including a first cutout and an inclination direction determining member and connected to the first thin film transistor, a direction controlling electrode connected to the second thin film transistor, a first storage electrode overlapping with the pixel electrode and the direction controlling electrode and applied with a first storage electrode signal having a first voltage, and a plurality of second storage electrodes overlapping with the direction controlling electrode. The second storage electrodes are applied with a second storage electrode signal having a periodically changing second voltage.

The present invention also discloses a method for driving an LCD including a first liquid crystal capacitor and a second liquid crystal capacitor. The method includes charging the first and second liquid crystal capacitors, maintaining the charged voltage of the first liquid crystal capacitor, and periodically changing the charged voltage of the second liquid crystal capacitor while the maintaining the charged voltage of the first liquid crystal capacitor such that a voltage between two terminals of the second liquid crystal capacitor is greater than a voltage between two terminals of the first liquid crystal capacitor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
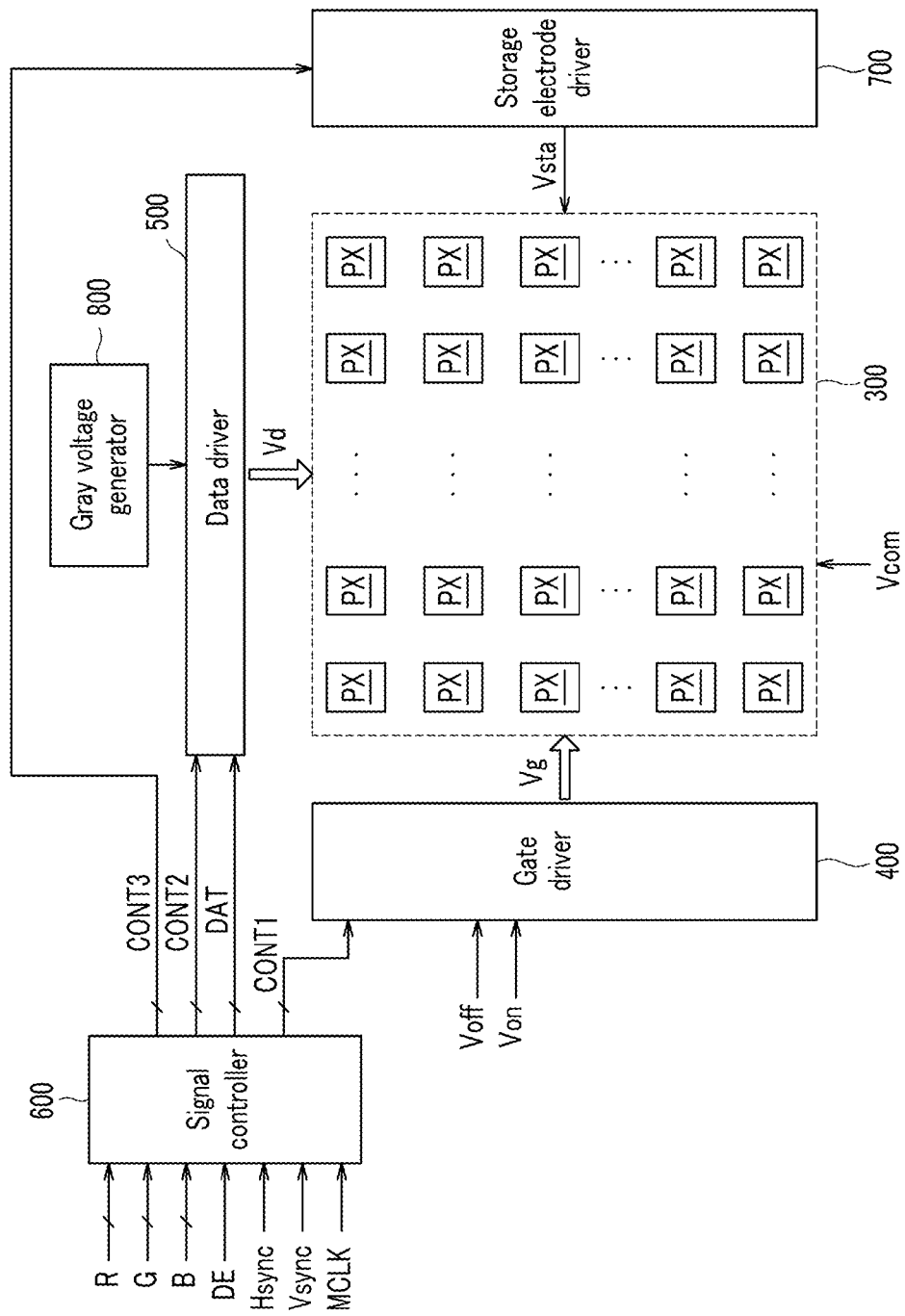
FIG. 1 is a block diagram of an LCD according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, intervening elements or layers may be present. In contrast, when an element is referred to as being "directly on" or "directly connected to" another element or layer, there are no intervening elements or layers present.

Referring to FIG. 1 an LCD according to an exemplary embodiment of the present invention includes a liquid crystal panel assembly 300, a gate driver 400, a data driver 500, a storage electrode driver 700, a gray voltage generator 800, and a signal controller 600.

The LC panel assembly 300 includes a plurality of signal lines (not shown), and a plurality of pixels PX connected to the signal lines and arranged substantially in a matrix, as seen in the equivalent circuit diagram. The LC panel assembly 300 further includes lower and upper panels 100 and 200 that face each other and an LC layer 3 interposed therebetween, as shown in the structural view of FIG. 2.

Figure 2:
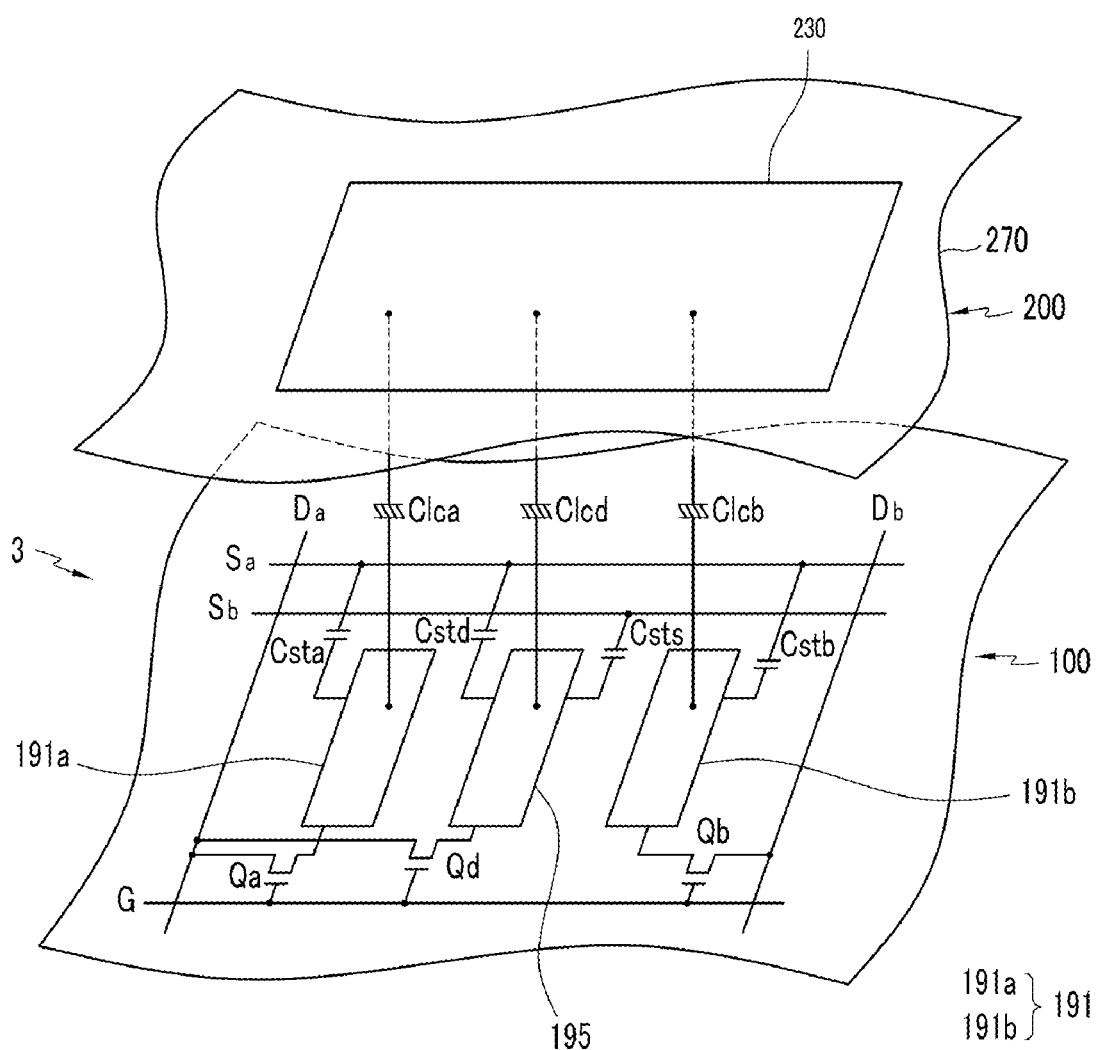
FIG. 2 is an equivalent circuit diagram of a pixel of an LCD according to an exemplary embodiment of the present invention.
Figure 3:
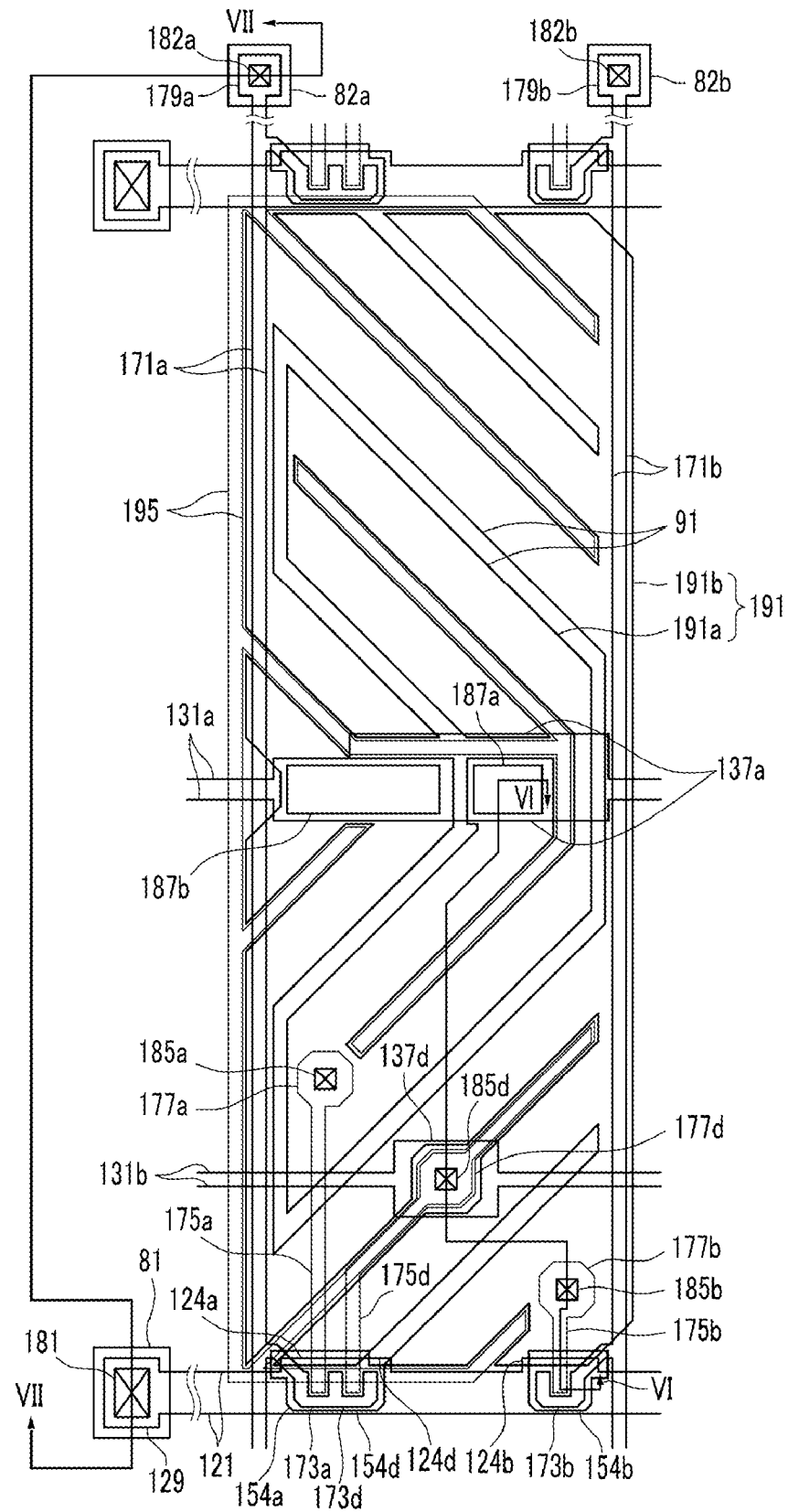
FIG. 3 is a layout view of an LCD according to an exemplary embodiment of the present invention.

Referring to FIG. 2, the signal lines G, Da, Db, Sa, and Sb include a plurality of gate lines G to transmit gate signals (also referred to as scanning signals), a plurality of pairs of first and second data lines Da and Db to transmit data voltages, and a plurality of pairs of first and second storage electrode lines Sa and Sb to transmit storage electrode signals. The gate lines G extend in a row direction and are parallel to each other, and the data lines Da and Db extend in a column direction and are parallel to each other.

Each pixel PX, for example the pixel PX connected to the gate line G and the data lines Da and Db, includes first, second, and third switching elements Qa, Qb, and Qd, first, second, and third LC capacitors Clca, Clcb, and Clcd, first, second, and third storage capacitors Csta, Cstb, and Cstd, and a direction controlling capacitor Csts.

The first, second, and third switching elements Qa, Qb, and Qd may be three-terminal elements, such as thin film transistors, and are provided on the lower panel 100.

The control terminal of the first switching element Qa is connected to the gate line G, the input terminal thereof is connected to the first data line Da, and the output terminal thereof is connected to the first LC capacitor Clca and the first storage capacitor Csta. The control terminal of the second switching element Qb is connected to the gate line G, the input terminal thereof is connected to the second data line Db, and the output terminal thereof is connected to the second LC capacitor Clcb and the second storage capacitor Cstb. The control terminal of the third switching element Qd is connected to the gate line G, the input terminal thereof is connected to the first data line Da, and the output terminal thereof is connected to the third LC capacitor Clcd, the third storage capacitor Cstd, and the direction controlling capacitor Csts.

The first and second LC capacitors Clca and Clcb each include a subpixel electrode 191a and 191b provided on the lower panel 100 and a common electrode 270 provided on the upper panel 200 as two terminals, and the third LC capacitor Clcd includes a direction controlling electrode 195 provided on the lower panel 100 and the common electrode 270 provided on the upper panel 200 as two terminals. The LC layer 3 disposed between the sub-pixel electrodes 191a and 191b and the common electrode 270 functions as a dielectric.

The subpixel electrode 191a and 191b are spaced apart from each, and together make up one pixel electrode 191. The direction controlling electrode 195 is spaced apart from the subpixel electrodes 191a and 191b. The common electrode 270 is disposed on the entire surface of the upper panel 200 and is supplied with a common voltage Vcom.

LC molecules of the LC layer 3 may have negative dielectric anisotropy and may be aligned such that their major axes are perpendicular to the two panels in the absence of an electric field.

The first, second, and third storage capacitors Csta, Cstb, and Cstd respectively function as auxiliary capacitors for the first, second, and third LC capacitors Clca, Clcb, and Clcd. The first, second, and third storage capacitors Csta, Cstb, and Cstd are formed by overlapping the first storage electrode line Sa provided on the lower panel 100 with the first subpixel electrode 191a, the second subpixel electrode 191b, and the direction controlling electrode 195, respectively, via an insulator disposed therebetween. The first storage electrode line Sa is supplied with a voltage, such as the common voltage Vcom. Alternatively, the first, second, and third storage capacitors Csta, Cstb, and Cstd may be formed by overlapping the pixel electrode 191 or the direction controlling electrode 195 with the previous gate line immediately above it via an insulator.

The direction controlling capacitor Csts is formed by overlapping the second storage electrode line Sb provided on the lower panel 100 with the direction controlling electrode 195 via the insulator. The second storage electrode line Sb is supplied with a storage electrode signal Vs periodically changes.

In order to implement color display, each pixel PX may uniquely display one primary color (spatial division) or each pixel PX may sequentially display the primary colors in turn (temporal division) such that the spatial or temporal sum of the primary colors is recognized as a desired color. An example of a set of primary colors includes red, green, and blue. FIG. 2 shows an example of spatial division in which each pixel PX includes a color filter 230 representing one of the primary colors in an area of the upper panel 200 facing the pixel electrode 191. Unlike in FIG. 2, the color filter 230 may be provided on top of or under the pixel electrode 191 provided on the lower panel 100

Polarizers (not shown) may be provided in the LC panel assembly 300.

Now, the LC panel assembly 300 will be described in detail with reference to FIG. 3, FIG. 4, FIG. 5, FIG. 6, and FIG. 7.

Referring to FIG. 3, FIG. 4, FIG. 5, FIG. 6, and FIG. 7, an LC panel assembly according to an exemplary embodiment of the present invention includes a lower panel 100, an upper panel 200, an LC layer 3, and polarizers 12 and 22.

First, the lower panel 100 will be described in detail.

A plurality of gate lines 121 and a plurality of pairs of first and second storage electrode lines 131a and 131b are disposed on an insulating substrate 110, which may be made of transparent glass or plastic.

The gate lines 121, which are spaced apart from each other, extend in a transverse direction. Each gate line 121 includes a plurality of first, second, and third gate electrodes 124a, 124b, and 124d, and an end portion 129 having a large area for connection with another layer or the gate driver 400. The first and third gate electrodes 124a and 124d are connected to each other.

The first and second storage electrode lines 131a and 131b extend parallel to the gate lines 121, and include first and second storage electrodes 137a and 137d, respectively, extending upward and downward. However, the shapes and the arrangements of the first and second storage electrode lines 131a and 131b may be modified as needed.

A gate insulating layer 140, which may be made of silicon nitride $SiN_x$ or silicon oxide $SiO_x$, is disposed on the gate lines 121 and the storage electrode lines 131a and 131b.

A plurality of first, second, and third semiconductor islands 154a, 154b, and 154d, which may be made of hydrogenated amorphous silicon (a-Si) or polysilicon, are disposed on the gate insulating layer 140. The first and third semiconductor islands 154a and 154d are connected to each other.

First ohmic contact islands (not shown), second ohmic contact islands 163b and 165b, and third ohmic contact islands (not shown) are respectively disposed on the first, second, and third semiconductor islands 154a, 154b, and 154d. The ohmic contacts 163b and 165b may be made of material such as n+ hydrogenated amorphous silicon with an n-type impurity, such as phosphor doped at high concentration, or of silicide.

A plurality of pairs of first and second data lines 171a and 171b and a plurality of first, second, and third drain electrodes 175a, 175b, and 175d are disposed on the ohmic contacts 163b and 165b and the gate insulating layer 140.

The first and second data lines 171a and 171b extend in a vertical direction and cross the gate lines 121. Each data line 171a includes a plurality of first, second, and third source electrodes 173a and 173d extending toward the first and third gate electrodes 124a and 124d. Each data line 171b includes a plurality of second source electrodes 173b extending toward the second gate electrodes 124b. The first and second data lines 171a and 171b respectively include end portions 179a and 179b having a large area for connection with another layer or the data driver 500.

The first, second, and third drain electrodes 175a, 175b, and 175d are spaced apart from each other, and are also spaced apart from the first and second data lines 171a and 171b.

The first and third source electrodes 173a and 173d are connected to each other.

The first source electrode 173a and the first drain electrode 175a are disposed on the first semiconductor island 154a, and the first drain electrode 175a includes an end portion 177a having a large area and another end portion having a bar shape and that is partly enclosed by the first source electrode 173a.

The second source electrode 173b and the second drain electrode 175b are disposed on the second semiconductor island 154b, and the second drain electrode 175b includes an end portion 177b having a large area and another end portion having a bar shape and that is partly enclosed by the second source electrode 173b.

The third source electrode 173d and the third drain electrode 175d are disposed on the third semiconductor island 154d. The third drain electrode 175d includes two line portions and an expanded area 177d connected therebetween. One end portion of the line portions is enclosed by the third source electrode 173d.

The first gate electrode 124a, the first source electrode 173a, and the first drain electrode 175a along with the first semiconductor island 154a make up the first thin film transistor Qa, which includes a channel in the first semiconductor island 154a disposed between the first source electrode 173a and the first drain electrode 175a. Also, the second gate electrode 124b, the second source electrode 173b, and the second drain electrode 175b along with the second semiconductor island 154b make up the second thin film transistor Qb, which includes a channel in the second semiconductor island 154b disposed between the second source electrode 173b and the second drain electrode 175b. Further, the third gate electrode 124d, the third source electrode 173d, and the third drain electrode 175d along with the third semiconductor island 154d make up the third thin film transistor Qd, which includes a channel in the third semiconductor island 154d disposed between the third source electrode 173d and the third drain electrode 175d.

The ohmic contacts 163b and 165b may be interposed only between the underlying semiconductors 154a, and the overlying data lines 171a and 171b and the overlying drain electrodes 175a, 175b, and 175d thereon, and may reduce contact resistance therebetween. The semiconductors 154a and 154b include a plurality of exposed portions, which are not covered with the data lines 171a and 171b and the drain electrodes 175a, 175b, and 175d, including portions located between the source electrodes 173a, 173b, and 173d and the drain electrodes 175a, 175b, and 175d.

A passivation layer 180 is disposed on the first and second data lines 171a and 171b, the drain electrodes 175a, 175b, and 175d, and the exposed semiconductors 154a and 154b. The passivation layer 180 may be made of an organic insulator and the surface thereof may be flat. The organic insulator may have photosensitivity, and its dielectric constant may be less than about 4.0. However, the passivation layer 180 may have a double-layered structure including a lower inorganic layer and an upper organic layer so that the exposed portions of the semiconductors 154a, 154b, and 154d are protected and the most can be made of the excellent insulating characteristics of the organic layer.

The passivation layer 180 has a plurality of contact holes 182a and 182b exposing the end portions 179a and 179b of the data lines 171a and 171b, respectively. Also, the passivation layer 180 has a plurality of contact holes 185a, 185b, and 185d exposing the first, second, and third drain electrodes 175a, 175b, and 175d, respectively. Further, the passivation layer 180 and the gate insulating layer 140 have a plurality of contact holes 181 exposing the end portions 129 of the gate lines 121. The passivation layer 180 also has first and second openings 187a and 187b that respectively overlap the first storage electrode 137a.

A plurality of pixel electrodes 191 that each include first and second subpixel electrodes 191a and 191b, a direction controlling electrode 195, and a plurality of contact assistants 81, 82a, and 82b, are disposed on the passivation layer 180. They may be made of a transparent conductor such as ITO or IZO, or a reflective conductor such as Al, Ag, Cr, and alloys thereof.

The first subpixel electrode 191a, the second subpixel electrode 191b, and the direction controlling electrode 195 may be connected to the first, second, and third drain electrodes 175a, 175b, and 175d through the contact holes 185a, 185b, and 185d, respectively, such that the first subpixel electrode 191a, the second subpixel electrode 191b, and the direction controlling electrode 195 receive the data voltages from the first, second, and third drain electrodes 175a, 175b, and 175d, respectively.

The data voltage applied to the first subpixel electrode 191a may differ from the data voltage applied to the second subpixel electrode 191b. The data voltages are preset for an input image signal, and the size of the data voltages may be set depending on the size and shape of the sub-pixel electrodes 191a and 191b. The areas of the first and second subpixel electrodes 191a and 191b may be different from each other. As an example, the first sub-pixel electrode 191a is supplied with a higher voltage than the second sub-pixel electrode

191b, and the area of the first subpixel electrode 191a is smaller than that of the second subpixel electrode 191b.

The subpixel electrodes 191a and 191b and the direction controlling electrode 195 respectively make up the first, second, and third LC capacitors Clca, Clcb, and Clcd with the common electrode 270 to store applied voltages even after the thin film transistors Qa, Qb, and Qd are turned off. The first subpixel electrode 191a, the second subpixel electrode 192a, and the direction controlling electrode 195 overlap the first storage electrode 137a to form the first, second, and third storage capacitors Csta, Cstb, and Cstd, which are connected in parallel with the first, second, and third LC capacitors Clca, Clcb, and Clcd to enhance the voltage storing capacity thereof. Here, because the passivation layer 180 includes first and second openings 187a and 187b, only the gate insulating layer 140 is disposed between the pixel electrode 191 and the first storage electrode 137a in the first and second openings 187a and 187b. Accordingly, the distance between the pixel electrode 191 and the first storage electrode 137a is decreased such that the capacities of the storage capacitors Csta and Cstb may be increased, which may improve the voltage storing capacity.

The direction controlling capacitor Csts is formed by overlapping the direction controlling electrode 195 and the third drain electrode 175d, which is connected to the direction controlling electrode 195 with the second storage electrode 137d.

Figure 4:
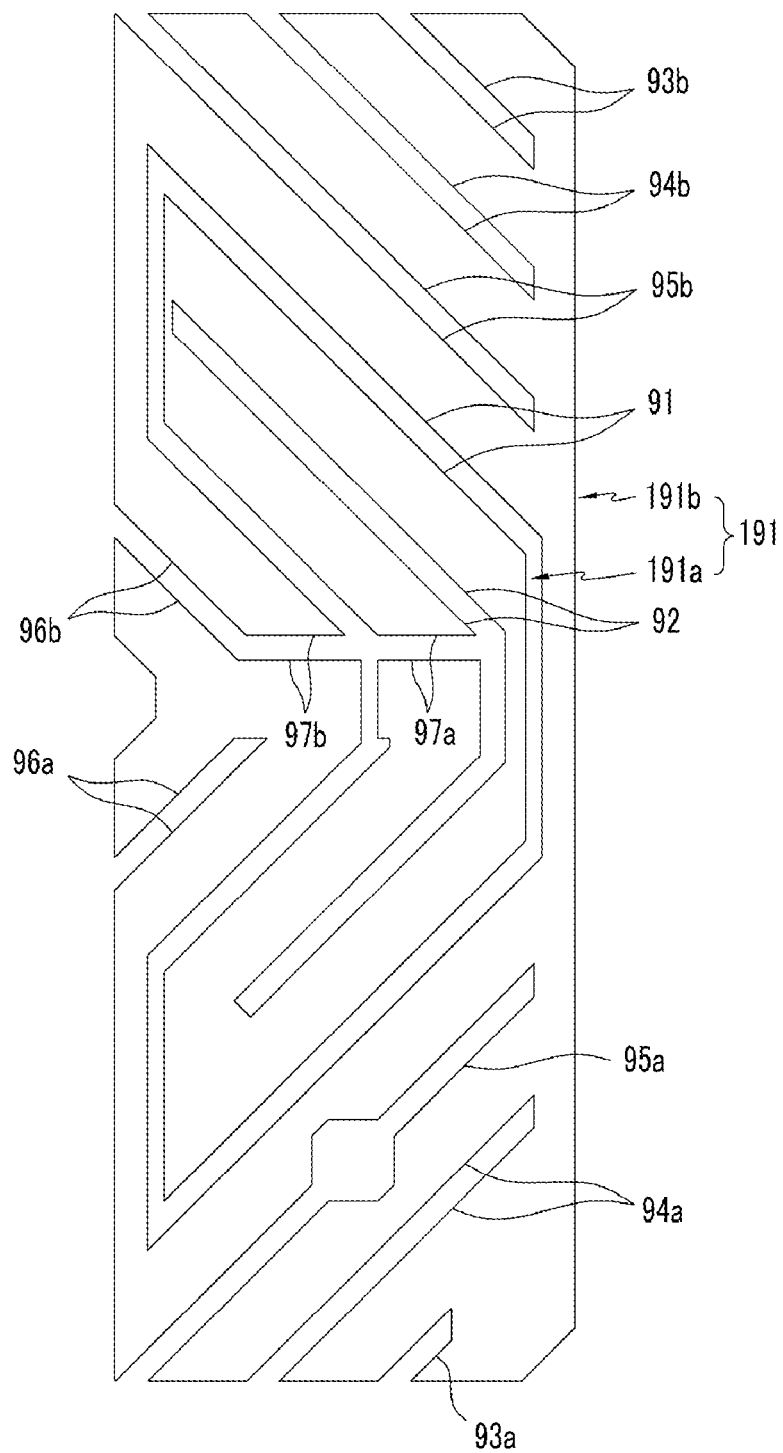
FIG. 4 is a layout view of a pixel electrode in an LCD according to an exemplary embodiment of the present invention.

Referring to FIG. 4, each pixel electrode 191 has a substantially rectangular shape having two main sides parallel to the gate lines 121 and two main sides parallel to the data lines 171a and 171b, and a chamfered right corner. The chamfered oblique sides of the pixel electrodes 191 are inclined with respect to the gate line 121 by an angle of about 45°.

A pair of first and second subpixel electrodes 191a and 191b that make up one pixel electrode 191 are engaged with each other with a gap 91 therebetween, and the first subpixel electrode 191a is arranged in the center of the second subpixel electrode 191b. The gap 91 includes upper and lower gaps, and the upper and lower gaps substantially slant and extend from the left side of the pixel electrode 191 toward the right side of the pixel electrode 191. The lower and upper gaps are inclined with respect to the gate line 121 by an angle of about 45°, and extend perpendicularly to each other.

The first subpixel electrode 191a includes a central cutout 92 and a transverse cutout 97a, and the first subpixel electrode 191a is partitioned into a plurality of regions by the central cutout 92. The central cutout 92 includes a vertical portion and a pair of oblique portions connected to the vertical portion. The vertical portion extends vertically with respect to the first storage electrode line 137a, and the pair of oblique portions extends from the vertical portion and are parallel to the right side of the pixel electrode 191. The pair of oblique portions are inclined with respect to the gate line 121 at an angle of about 45° and extend perpendicular to each other. The transverse portion cutout 97a is connected to the central cutout 92.

The second subpixel electrode 191b includes upper cutouts 93b, 94b, 95b, and 96b, lower cutouts 93a, 94a, 95a, and 96a, and a transverse cutout 97b, and the second subpixel electrode 191b is partitioned into a plurality of regions by the upper and lower cutouts 93a, 93b, 94a, 94b, 95a, 95b, 96a, and 96b. The lower cutouts 93a, 94a, 95a, and 96a and the upper cutouts 93b, 94b, 95b, and 96b are symmetrical with respect to the first storage electrode line 131a. The upper and lower cutouts 93a, 93b, 94a, 94b, 95a, 95b, 96a, and 96b are connected to the upper side, the lower side, or the left side of the pixel electrode 191, and extend from the left side of the pixel electrode 191 toward the right side of the pixel electrode 191. The lower cutouts 93a, 94a, 95a, and 96a are respectively disposed in the lower portion of the pixel electrode 191 and the upper cutouts 93b, 94b, 95b, and 96b are disposed in the upper portion of the pixel electrode 191 with respect to the first storage electrode line 131a. The upper cutouts 93b, 94b, 95b, and 96b and the lower cutouts 93b, 94b, 95b, and 96b are inclined with respect to the gate line 121 by an angle of about 45° and extend perpendicularly to each other. The transverse portion cutout 97b is connected to the upper cutout 96b.

The transverse portion 97a of the first subpixel electrode 191a is connected to the transverse portion 97b of the second subpixel electrode 191b.

Figure 5:
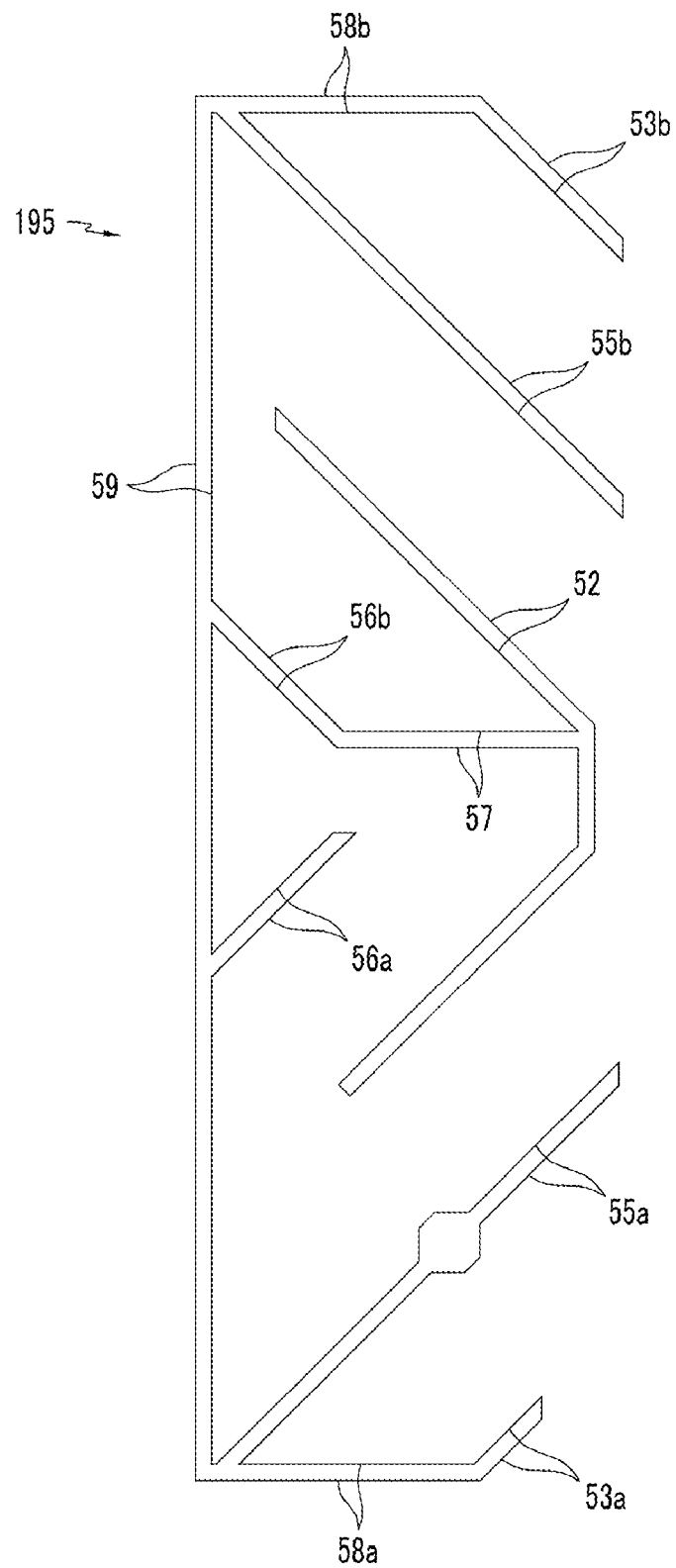
FIG. 5 is a layout view of a direction controlling electrode in an LCD according to an exemplary embodiment of the present invention.
Figure 6:
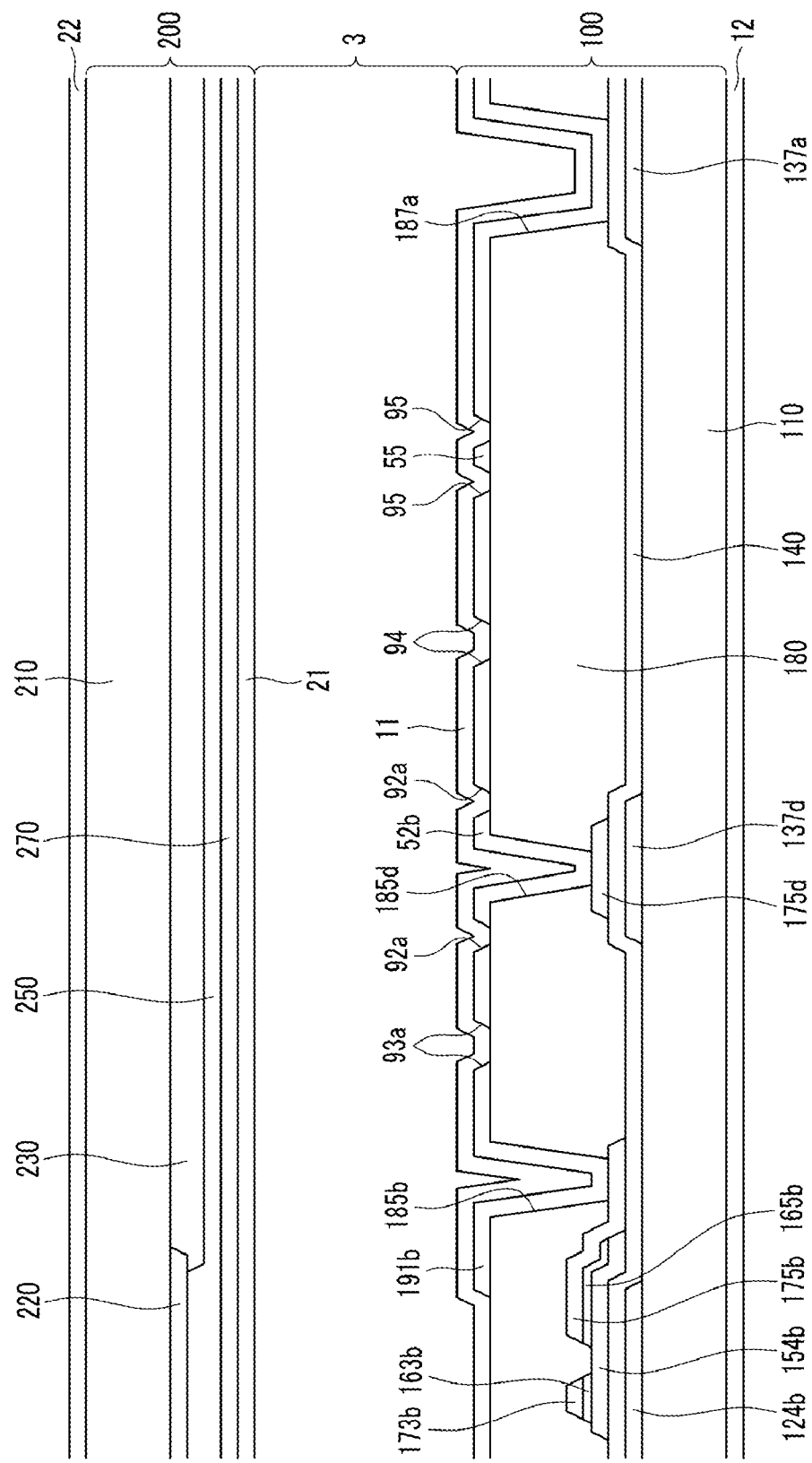
FIG. 6 and FIG. 7 are cross-sectional views of the LCD shown in FIG. 3 taken along lines VI-VI and VII-VII, respectively.
Figure 7:
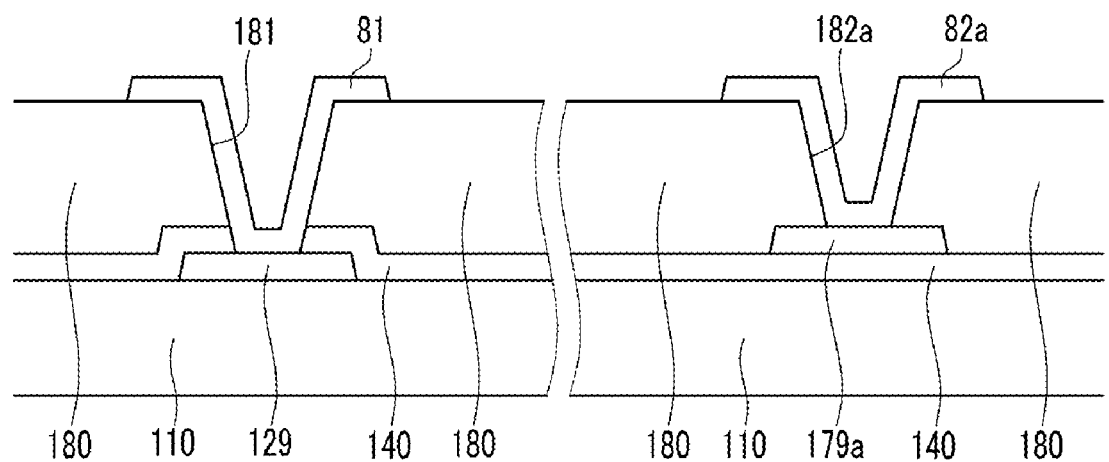

Referring to FIG. 5, the direction controlling electrode 195 includes first, second, and third transverse portions 57, 58a, and 58b, a vertical portion 59, lower oblique portions 53a, 55a, and 56a, upper oblique portions 53b, 55b, and 56b, and a central portion 52.

The first, second, and third transverse portions 57, 58a, and 58b are parallel to the gate line 121, and the vertical portion 59 is parallel to the data lines 171a and 171b. The upper oblique portions 53b, 55b, and 56b have substantially the same shape as the upper cutouts 93b, 95b, and 96b of the pixel electrode 191, and the lower oblique portions 53a, 55a, and 56a have substantially the same shape as the lower cutouts 93a, 95a, and 96a of the pixel electrode 191. Also, the central portion 52 has substantially the same shape as the central cutout 95 of the pixel electrode 191, and the first transverse portion 57 has substantially the same shape as the transverse cutouts 97a and 97b of the pixel electrode 191. When overlapping the direction controlling electrode 195 with the pixel electrode 191, the vertical portion 59 and the second and third transverse portions 58a and 58b of the direction controlling electrode 195 are disposed outside the pixel electrode 191, and the upper oblique portions 53b, 55b, and 56b, the lower oblique portions 53a, 55a, and 56a, and the central portion 52 are respectively inserted in the upper cutouts 93b, 95b, and 96b, the lower cutouts 93a, 95a, and 96a, and the central cutout 95 of the pixel electrode 191.

The cutouts 93a, 93b, 94a, 94b, 95a, 95b, 96a, and 96b may be replaced with protrusion or depressions.

The contact assistants 81, 82a, and 82b are respectively connected to the end portions 129, 179a, and 179b of the gate line 121 and the data lines 171a and 171b through the contact holes 181, 182a, and 182b, respectively. The contact assistants 81, 82a, and 82b aid the adhesion of the exposed end portions 129, 179a, and 179b of the gate lines 121 and the data lines 171a and 171b to external apparatuses, and protect these portions.

Next, the upper panel 200 will be described.

A light blocking member 220 is disposed on an insulating substrate 210. The light blocking member 220 defines a plurality of openings facing the pixel electrode 191 and may be a black matrix. The light blocking member 220 prevents light leakage between the pixel electrodes 191.

A plurality of color filters 230 is also disposed on the substrate 210. The color filters 230 are disposed in the areas enclosed by the light blocking member 220. The color filters 230 may extend in a longitudinal direction along the pixel electrodes 191. Each color filter 230 may represent one of the primary colors, such as red, green, or blue.

A common electrode 270 is disposed on the color filters 230 and light blocking member 220. The common electrode 270 does not have a cutout such that the common electrode 270 includes a continuous surface. Also, a protrusion is not needed in the common electrode 270. The common electrode 270 may be made of a transparent conductor such as ITO or IZO.

Alignment layers 11 and 21 to align the LC layer 3 are disposed on inside surfaces of the panels 100 and 200, and polarizers 12 and 22 are installed on outside surfaces of the panels 100 and 200, respectively.

The LCD may include a backlight unit (not shown) to supply light to the polarizers 12 and 22, the panels 100 and 200, and the LC layer 3.

The LC layer 3 has negative dielectric anisotropy, and the LC molecules in the LC layer 3 are aligned such that their long axes are perpendicular to the surfaces of the panels 100 and 200 in the absence of an electric field. Therefore, light incident into the LC layer 3 cannot pass through the crossed polarizers 12 and 22 and is blocked.

Referring to FIG. 1 again, the gray voltage generator 800 generates two sets of gray voltages (or reference gray voltages) related to the transmittance of the pixels PX. However, the gray voltage generator 800 may generate only a given number of gray voltages (referred to as reference gray voltages) instead of generating all of the gray voltages. Gray voltages of one set have a positive value with respect to the common voltage Vcom, while gray voltages of the other set have a negative value with respect to the common voltage Vcom.

The gate driver 400 is connected to the gate lines G of the LC panel assembly 300 and synthesizes a gate-on voltage Von and a gate-off voltage Voff to generate gate signals Vg, which are applied to the gate lines G.

The data driver 500 is connected to the data lines Da and Db of the LC panel assembly 300 and selects the gray voltages supplied from the gray voltage generator 800 and then applies a selected gray voltage to the data lines Da and Db as a data voltage Vd. Alternatively, when the grayscale voltage generator 800 generates only a predetermined number of reference grayscale voltages instead of all the grayscale voltages, the data driver 500 may generate the grayscale voltages for all the grayscale voltages by dividing the reference grayscale voltages and select the data signals among the generated grayscale voltages.

The storage electrode driver 700 is connected to the second storage electrode line Sb, and applies a storage electrode signal Vst as a periodic signal to the second storage electrode line Sb.

The signal controller 600 controls the gate driver 400, the data driver 500, and the storage electrode driver 700.

Each driver 400, 500, 600, 700, and 800 may be installed directly on the LC panel assembly 300 in the form of at least one integrated circuit chip. Alternatively, each driver 400, 500, 600, 700, and 800 may be a tape carrier package (TCP) installed on a flexible printed circuit film (not shown) and attached to the LC panel assembly 300 or installed on a separate printed circuit board (not shown). Alternatively, the drivers 400, 500, 600, 700, and 800 may be integrated with the LC panel assembly 300 together with the signal lines G, Da, and Db, the film transistor switching elements Qa, Qb, and Qd, and the like. In addition, the drivers 400, 500, 600, 700, and 800 may be integrated as a single chip. In this case, at least one of the drivers 400, 500, 600, 700, and 800 or at least one circuit element making up the drivers 400, 500, 600, 700, and 800 may be disposed outside the single chip.

The operations of the LCD will now be explained in detail.

The signal controller 600 receives input image signals R, G, and B and input control signals to control display of the input image signals R, G, and B from an external graphics controller (not shown). The input image signals R, G, and B include luminance information of each pixel PX, and the luminance information includes a determined number of gray levels, e.g., 1024 (=$2^{10}$), 256 (=$2^{8}$), or 64 (=$2^{6}$) gray levels. Examples of the input control signals include a vertical synchronization signal Vsync, a horizontal synchronization signal Hsync, a main clock signal MCLK, and a data enable signal DE.

The signal controller 600 processes the input image signals R, G, and B according to an operating condition of the LC panel assembly 300 based on the input image signals R, G, and B and the input control signals to generate a gate control signal CONT1, a data control signal CONT2, and the like, and thereafter sends the generated data control signal CONT1 to the gate driver 400, the generated data control signal CONT2 and the processed image signal DAT to the data driver 500, and the storage electrode control signal CONT3 to the storage electrode driver 700.

The gate control signal CONT1 includes scan start signals STV to start a scan, and at least one clock signal to control an output period of the gate-on voltage Von. The gate control signal CONT1 may further include an output enable signal OE to limit a duration time of the gate-on voltage Von.

The data control signal CONT2 includes a horizontal synchronization start signal STH to initiate data transmission of the image signal DAT for a row [group] of pixels PX, a load signal LOAD to request application of the data signals to the data lines Da and Db, and a data clock signal HCLK The data control signal CONT2 may further include a reverse signal RVS to invert voltage polarity of the data signal with respect to the common voltage Vcom (hereinafter, "voltage polarity of the data signal with respect to the common voltage" is abbreviated to "polarity of the data signal").

The storage electrode driver 700 applies storage electrode signal Vst to the second storage electrode line Sb according to the storage electrode control signal CONT3 transmitted from the signal controller 600. The storage electrode signal Vst is periodically inverted with reference to the common voltage Vcom.

The data driver 500 receives digital image signals DAT for a row of pixels PX according to the data control signal CONT2 transmitted from the signal controller 600, and selects a grayscale voltage corresponding to each digital image signal DAT to convert the digital image signals DAT into analog data signals. Thereafter the data driver 500 applies the converted analog data signals to corresponding data lines Da and Db.

The gate driver 400 applies a gate-on voltage Von to the gate lines G according to the gate control signal CONT1 transmitted from the signal controller 600 to turn on the first, second, and third switching elements Qa, Qb, and Qd connected to the gate lines G. Then, the data signals applied to the data lines Da and Db are applied to corresponding pixels PX through the turned-on first, second, and third switching elements Qa, Qb, and Qd.

A difference between a voltage of the data signal applied to the pixels PX and the common voltage Vcom appears as a charged voltage of the first and second LC capacitors Clca and Clcb, that is, a pixel voltage. Also, a difference between a voltage of the data signal applied to the direction controlling electrode 195 and the common voltage Vcom appears as a charged voltage of the third LC capacitor Clcd.

If the first, second, and third switching elements Qa, Qb, are Qd are turned off, and the pixel electrode 191 and the direction controlling electrode 195 are floated. However, because the pixel electrode 191 and the direction controlling electrode 195, along with the second storage electrode line 131b, make up the capacitor Csts, the voltage of the direction controlling electrode 195 changes according to the voltage of the second storage electrode line 131b so that the voltages of the two electrodes 191 and 195 are different from each other. If the phase and the polarity of the second storage electrode signal Vst are appropriately controlled, the average voltage of the direction controlling electrode 195 corresponding to the common voltage Vcom may be higher than the average voltage of the pixel electrode 191 corresponding to the common voltage Vcom.

If the voltage differences between the common electrode 270 and the pixel electrode 191 and direction controlling electrode 195 are generated, a main electric field that is perpendicular to the surfaces of the display panels 100 and 200 is generated. LC molecules of the LC layer 3 are inclined so that a long axis thereof is perpendicular to a direction of an electric field. Hereinafter, both the pixel electrode 191 and the common electrode 270 are commonly referred to as "field generating electrodes".

The gap 91, the cutouts 92, 93a, 93b, 94a, 94b, 95a, 95b, 96a, and 96b, and the oblique sides of the pixel electrodes 191 distort the electric field to have a horizontal component that determines the tilt directions of the LC molecules. The horizontal component of the main electric field is perpendicular to the oblique edges of the cutouts 92, 93a, 93b, 94a, 94b, 95a, 95b, 96a, and 96b and the oblique edges of the pixel electrodes 191, and tends toward the inside or outside of the pixel electrode 191 according to the polarity of the voltage applied to the pixel electrode 191. For example, if the voltage of the pixel electrode 191 is greater than the common voltage Vcom, the horizontal component tends toward the outside of the pixel electrode 191.

On the other hand, since the voltage difference between the direction controlling electrode 195 and the pixel electrode 191 is generated, a sub-electric field that has substantially a horizontal component that is parallel to the horizontal component of the main electric field is generated. As above-described, with reference to the common voltage Vcom, since the voltage of the direction controlling electrode 195 is greater than the voltage of the pixel electrode 191, the direction of the horizontal component of the sub-electric field is opposite the direction of the horizontal component of the main electric field, and the strength thereof is greater than that of the horizontal component of the main electric field. Therefore, the horizontal component of the electric field generated in the cutouts 92, 93a, 93b, 95a, 95b, 96a, and 96b where the direction controlling electrode 195 is disposed is the same as the direction of the electric field generated in the gap 91 close thereto, the remaining cutouts 94a and 94b, or the oblique edges of the pixel electrode 191.

As above-described, the cutouts 92, 93a, 93b, 94a, 94b, 95a, 95b, 96a, and 96b divide the pixel electrode 191 into a plurality of sub-areas, and each sub-area has two major edges parallel to each other.

Since the LC molecules on each sub-area tilt perpendicular to the major edges and are influenced by the horizontal component of the electric field having the direction as above-described, the azimuthal distribution of the tilt directions are localized to four directions. In this way, the reference viewing angle of the LCD is increased by varying the tilt directions of the LC molecules.

On the other hand, one input image data is converted into a pair of output image data, and the pair of output image data provides different transmittances to the subpixel electrodes 191a and 191b, respectively. Accordingly, different gamma curves appear in the two subpixels 191a and 191b and the gamma curve of one pixel PX is a curved line in which the gamma curves are combined. A combined gamma curve in the front side may be accorded with the reference gamma curve in the front side that is the most suitable for the liquid crystal panel assembly, and a combined gamma curve in the lateral side may be made closer to the reference gamma curve in the front side Accordingly, the image data is converted to improve the side visibility. Furthermore, as above-described, the area of the second subpixel electrode 191b to receive the relatively lower voltage is larger than the area of the first subpixel electrode 191a such that distortion of the combined gamma curve in the lateral side may be minimized.

The arrangements of the LC molecules of the LC layer 3 are changed according to the magnitude of the voltage of the pixel electrode 191, and the changes in polarization of the light incident to the LC layer 3 vary according to the arrangements of the LC molecules. The changes in the polarization are represented by the changes in transmittance by a polarizer attached on the display panel assembly 300.

By repeating this procedure by a unit of a horizontal period (also referred to as "1H" and that is equal to one period of the horizontal synchronization signal Hsync and the data enable signal DE), all gate lines $G_1$-$G_n$ are sequentially supplied with the gate-on voltage Von, thereby applying the data voltages to all pixels PX to display an image for a frame.

When the next frame starts, the inversion signal RVS applied to the data driver 500 is controlled such that the polarity of the data voltages is reversed (which is referred to as frame inversion). The inversion signal RVS may also be controlled such that the polarity of the data voltages flowing in a data line is periodically reversed during one frame (for example, row inversion and dot inversion).

Now, a method for driving an LCD according to an exemplary embodiment of the present invention will be described in detail with reference to FIG. 8.

Figure 8:
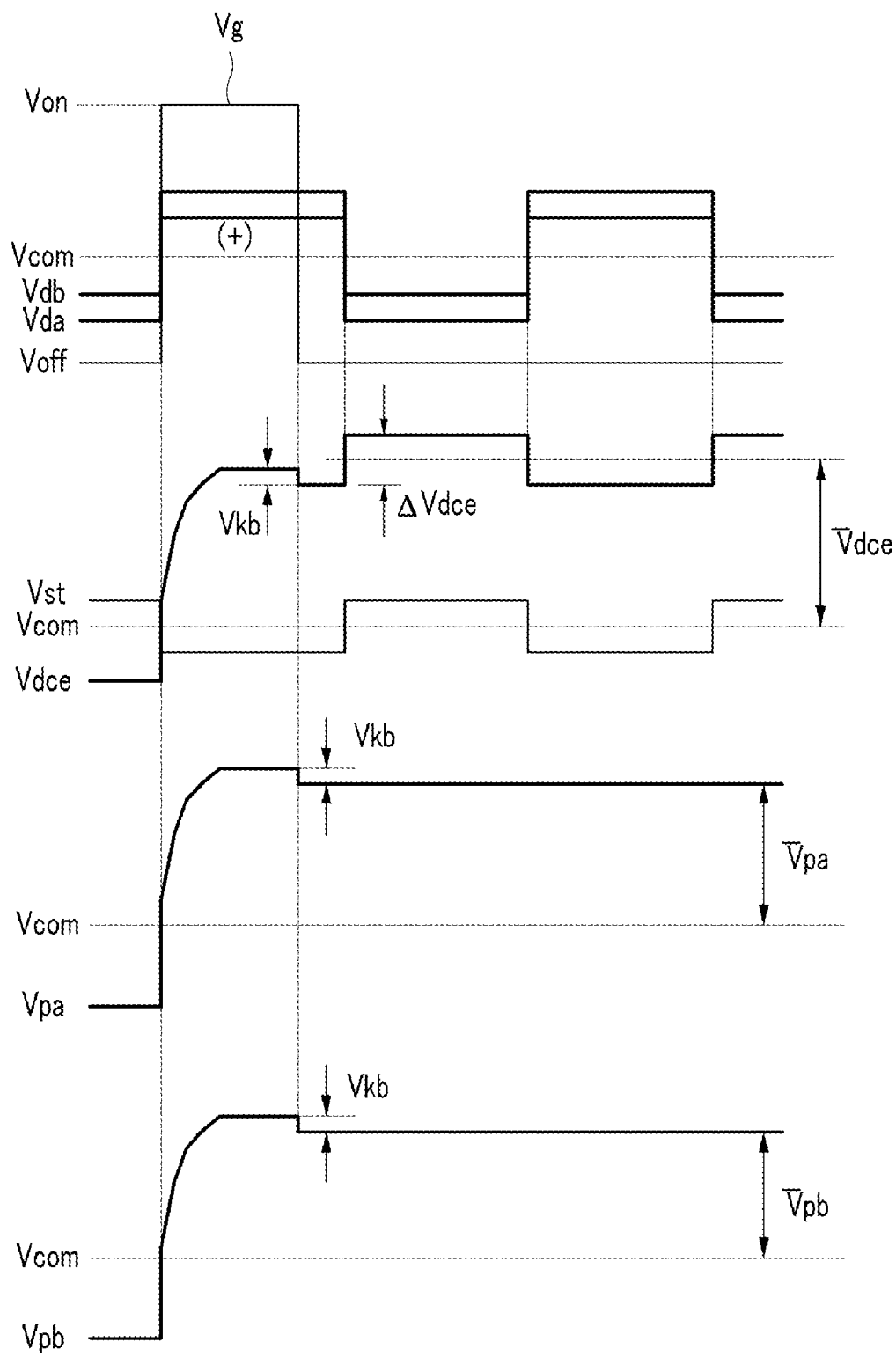
FIG. 8 is a waveform diagram of a driving signal of an LCD according to an exemplary embodiment of the present invention.

FIG. 8 is a waveform of a driving signal of an $i^{th}$ row pixel in an LCD according to an exemplary embodiment of the present invention.

Referring to FIG. 8, the polarities of the first and second data voltages Vda and Vdb, which are applied to the first and second data lines Da and Db and the storage electrode signal Vst are inverted, with respect to the common voltage Vcom, for every one frame period. The polarity of the storage electrode signal Vst is opposite to the polarities of the first and second data voltages Vda and Vdb. The polarities of the first and second data voltages Vda and Vdb applied to the first and second data lines Da and Db are positive when the gate signal Vg is applied to the gate line G with the gate-on voltage Von. The direction controlling electrode voltage Vdce, the first subpixel electrode voltage Vpa, and the second subpixel electrode voltage Vbp are changed from negative polarity to positive polarity. Here, the direction controlling electrode 195 and the first subpixel electrode 191a are charged with the same voltage Vda, and the second subpixel electrode 191b is charged with the voltage Vdb, which is smaller than the voltage Vda. The storage electrode signal Vst has negative polarity during the time.

If the gate signal Vg is changed to the gate-off voltage Voff, the direction controlling electrode voltage Vdce and the first and second subpixel electrode voltages Vpa and Vpb are dropped by the kickback voltage Vkb. After that, the direction controlling electrode voltage Vdce is periodically changed according to the change of the storage electrode voltage Vst. Here, the direction controlling electrode voltage Vdce is increased by an arbitrary value ΔVdce according to the increase of the storage electrode signal Vst and is again returned to the original value in a periodic fashion, and the first and second subpixel electrode voltages Vpa and Vpb are respectively dropped by the kickback voltage Vkb and maintained with the resultant value.

The direction controlling electrode voltage $\nabla$ dce for the common electrode Vcom is obtained by subtracting the value of the kickback voltage Vkb from the initial value of the direction controlling electrode voltage Vdce and adding the average value of the change amount $\Delta$Vdce of the direction controlling electrode voltage Vdce. The voltages Vpa and Vpb of the first and second subpixel electrodes 191a and 191b is maintained by subtracting the kickback voltage Vkb from the initial value. Accordingly, the direction controlling electrode voltage $\nabla$ dce is maintained to be greater than the first subpixel electrode voltage $\nabla$ pa and the second subpixel electrode voltage $\nabla$ pb with reference to the common electrode voltage Vcom.

Now, an LC panel assembly according to another exemplary embodiment of the present invention will be described in detail with the reference to FIG. 9.

Figure 9:
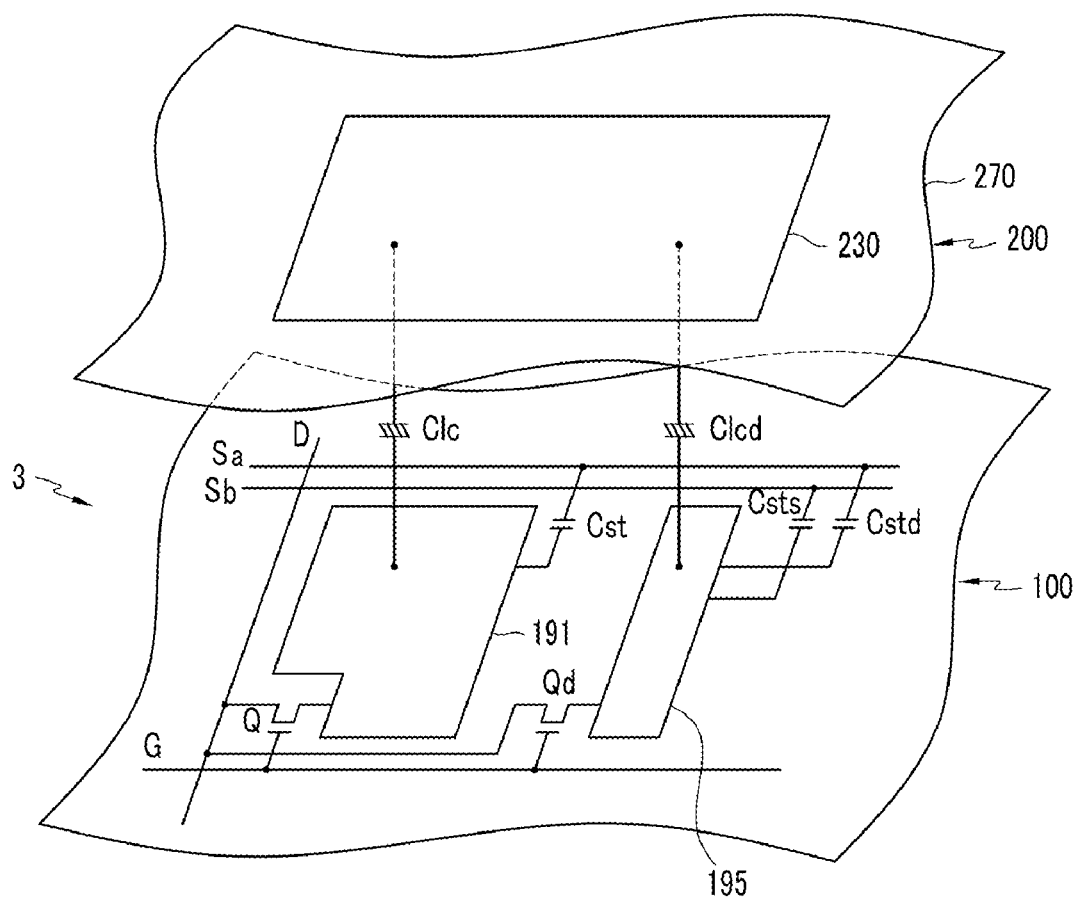
FIG. 9 is an equivalent circuit diagram of a pixel of an LCD according to another exemplary embodiment of the present invention.

FIG. 9 is an equivalent circuit diagram of a pixel in an LC panel assembly according to another exemplary embodiment of the present invention.

Referring to FIG. 9, an LC panel assembly 300 according to an exemplary embodiment of the present invention includes lower and upper panels 100 and 200 facing each other, and an LC layer 3 disposed therebetween.

The liquid crystal panel assembly 300 includes a plurality of signal lines G, D, Sa, and Sb, and a plurality of pixels PX connected thereto and arranged substantially in a matrix, as seen in the equivalent circuit diagram.

The signal lines G, D, Sa, and Sb include a plurality of gate lines G, a plurality of data lines D, and a pair of plurality of first and second storage electrode lines Sa and Sb transmitting storage electrode signals. The pixel includes two switching elements Q and Qd, two LC capacitors Clc and Clcd, two storage capacitors Cst and Cstd, and a direction controlling capacitor Csts.

Since the LC panel assembly shown in FIG. 9 includes one pixel electrode 191, unlike the LC panel assembly of FIG. 2, one liquid crystal capacitor Clc including the pixel electrode 191 and the common electrode 270 as two terminals is provided, and one storage capacitor Cst including the pixel electrode 191 and the first storage electrode line Sa as two terminals is provided.

In FIG. 9 and FIG. 2, constituent elements indicated by the same reference numerals have the same functions, and descriptions thereof are omitted.

As above-described, with reference to the common voltage, the direction controlling electrode voltage is higher than the pixel electrode voltage in exemplary embodiments of the present invention such that a wide viewing angle may be obtained without a cutout or a protrusion in/on the common electrode in the VA mode LCD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a first thin film transistor;
    a second thin film transistor;
    a pixel electrode comprising a first cutout and an inclination direction determining member, the pixel electrode being connected to the first thin film transistor;
    a direction controlling electrode connected to the second thin film transistor;
    a first storage electrode overlapping with the pixel electrode and the direction controlling electrode, the first storage electrode to receive a first storage electrode signal having a first voltage; and
    a second storage electrode overlapping with the direction controlling electrode, the second storage electrode to receive a second storage electrode signal having a second voltage that periodically changes.

2. The liquid crystal display of claim 1, wherein a voltage applied to the direction controlling electrode is greater than a voltage of the pixel electrode with reference to a third voltage.

3. The liquid crystal display of claim 1, wherein the pixel electrode and the direction controlling electrode are spaced apart from each other.

4. The liquid crystal display of claim 1, wherein the pixel electrode and the direction controlling electrode comprise the same material and are on the same layer.

5. The liquid crystal display of claim 1, further comprising:
    a common electrode facing the pixel electrode and the direction controlling electrode, the common electrode having a continuous surface.

6. The liquid crystal display of claim 1, further comprising:
    a data line connected to the first thin film transistor and the second thin film transistor; and
    a gate line connected to the first thin film transistor and the second thin film transistor.

7. The liquid crystal display of claim 6, wherein the inclination direction determining member comprises a first oblique portion that makes an oblique angle with the data line or the gate line.

8. The liquid crystal display of claim 7, wherein the oblique angle is substantially 45°.

9. The liquid crystal display of claim 7, wherein the first cutout comprises a second oblique portion parallel to the first oblique portion.

10. The liquid crystal display of claim 6, further comprising:
    an organic layer formed between the data line and the pixel electrode.

11. The liquid crystal display of claim 1, wherein at least a portion of the direction controlling electrode extends corresponding to the first cutout.

12. The liquid crystal display of claim 11, wherein at least a portion of the direction controlling electrode is exposed through the first cutout.

13. The liquid crystal display of claim 1, wherein the inclination direction determining member comprises a second cutout.

14. The liquid crystal display of claim 1, wherein
    the pixel electrode comprises a first subpixel electrode and a second subpixel electrode spaced apart from each other.

15. The liquid crystal display of claim 14, wherein a voltage applied to the first subpixel electrode is different from a voltage applied to the second subpixel electrode.

16. The liquid crystal display of claim 15, further comprising
    a third thin film transistor connected to the second subpixel electrode,
    wherein the first subpixel electrode is connected to the first thin film transistor.

17. The liquid crystal display of claim 16, further comprising
    a first data line connected to the first thin film transistor and the second thin film transistor;

a second data line connected to the third thin film transistor; and a gate line connected to the first thin film transistor, the second thin film transistor, and the third thin film transistor.

18. The liquid crystal display of claim 17, wherein the first thin film transistor and the third thin film transistor each comprise a gate electrode, a source electrode, and a drain electrode, the gate electrodes of the first thin film transistor and the third thin film transistor are connected to each other, and the source electrodes of the first film transistor and the third thin film transistor are connected to each other.

19. A method for driving a liquid crystal display comprising a first liquid crystal capacitor and a second liquid crystal capacitor, comprising:

charging the first liquid crystal capacitor and the second liquid crystal capacitor;

maintaining the charged voltage of the first liquid crystal capacitor; and periodically swinging the charged voltage of the second liquid crystal capacitor while maintaining the charged voltage of the first liquid crystal capacitor such that a voltage between two terminals of the second liquid crystal capacitor is greater than a voltage between two terminals of the first liquid crystal capacitor.

20. The method of claim 19, wherein the liquid crystal display further comprises a third liquid crystal capacitor having a smaller charged voltage than the first liquid crystal capacitor, the method further comprising:

maintaining the charged voltage of the third liquid crystal capacitor; and periodically swinging the charged voltage of the second liquid crystal capacitor while maintaining the charged voltage of the third liquid crystal capacitor such that the voltage between two terminals of the second liquid crystal capacitor is greater than a voltage between two terminals of the third liquid crystal capacitor.

* * * * *